3,520,879
PREPARATION OF 17α-ACETOXY-6α-METHYL-PREGN-4-EN-20-ONE
Bjarte Löken, Caguas, Puerto Rico, and I. V. Sollins, Rye, N.Y., assignors to Phytogen Products, Inc., Mamaroneck, N.Y., a corporation of Delaware
No Drawing. Filed May 23, 1967, Ser. No. 640,483
Int. Cl. C07c 167/30, 173/00
U.S. Cl. 260—239.55       8 Claims

ABSTRACT OF THE DISCLOSURE

A technique is provided for preparation of 17α-acetoxy-6α-methylpregn-4-en-20-one from 5α,17α-dihydroxy - 20-ethylenedioxy-6β-methylpregnan - 3 - one which involves dehydration, selective reduction and hydrolysis followed by acetylation.

The 5α,17α-dihydroxy-20-ethylene-dioxy - 6β - methylpregnan-3-one may be prepared by oxidation of 20-ethylene-dioxy-6β-methylpregnan-3α,5α,17α - triol in dimethyl formamide with chromium trioxide in sulfuric acid.

---

This invention relates to steroids: more particularly to a novel method for preparation of 17α-acetoxy-6α-methyl-pregn-4-en-20-one.

This compound, described in Pat. 3,192,202, has been found to exhibit anti-ovulatory properties and has shown promise for birth control use, but suffers from the serious disadvantages of preparation by complex techniques, poor product yield, expensive source materials, and the like.

Applicant's copending application, Ser. No. 521,545, filed Jan. 19, 1966, describes what is believed to be a novel intermediate and conversion thereof into 17α-acetoxy-6α-methylpregn-4-en-20-one. Conversion is effected by subjecting this intermediate, i.e. 5α,17α-dihydroxy-20-ethylene-dioxy-6β-methylpregnan-3-one, to a Wolff-Kishner type of reduction, followed by acetylation. A more advantageous conversion technique has now been found.

Briefly, the present conversion involves subjecting 5α,17α-dihydroxy-20-ethylenedioxy - 6β - methylpregnan - 3-one to strongly alkaline dehydrating conditions, thereby forming 17α-hydroxy-20-ethylenedioxy-6α - methylpregn-4-en-3-one, following which reduction is effected by lithium aluminum hydride in the presence of anhydrous aluminum chloride, then hydrolysis forming 17α-hydroxy-6α-methylpregn-4-en-20-one. Thereafter an acetylization reaction creates the desired 17α-acetoxy-6α-methylpregn-4-en-20-one.

Another aspect of the present conversion involves preparing the 5α,17α-dihydroxy-20-ethylenedioxy-6β-methylpregnan-3-one from 20-ethylenedioxy-6β-methylpregnan-3β,5α,17α-triol by direct chromic acid oxidation using dimethyl formamide as solvent. Reaction temperatures are maintained in the range of 30°–60° C., preferably in the range of 50°–60° C.

According to the present procedure, chromium trioxide in sulfuric acid, e.g. Jones' solution is added (slowly) to a solution of the steroid in dimethyl formamide. This technique is more advantageous for commercial scale production than the use of a chromium trioxide-pyridine complex (as described in applicant's application, Ser. No. 521,545) because the complex constitutes a substantial fire hazard. Operation according to the present invention avoids the hazards in preparing and storing large quantities of the complex, or the complication of using the cautious approach of oxidizing only small batches.

The process of oxidation with chromium trioxide and sulfuric acid in dimethyl formamide solution is applicable generally to secondary hydroxy steroid ketals notably 11 or 3 hydroxy steroid ketals, even 3,11 dihydroxy steroid ketals in the instance when it is desired to maintain the ethylene ketal blocking group intact. The pyridine chromate oxidation method is difficult to use on a technical scale, and besides, operates with a contact time of 15–20 hours (overnight) at room temperature. Operational conditions for oxidation in dimethyl formamide according to practice of the present invention permits the reaction to be completed at 50°–60° C. with gains in speed and efficacy, and no loss of oxidative selectivity.

A related direct chromium trioxide in sulfuric acid oxidation technique is described in applicant's prior Pat. 3,290,322, employing for solvent purposes acetone, tetrahydrofurane or butanone. That procedure is inapplicable, however, to the hydroxy steroid ketals, because maintenance of the ethylene ketal blocking group intact during the chromic acid oxidation does not occur when these solvents, e.g. acetone is used as solvent. Sulfuric acid catalyzes regeneration of the ketone by interchange with the acetone solvent, but with dimethyl formamide as the solvent, no ketal cleavage takes place. In the present reaction sequence, the reason for maintaining the 20-ethylene ketal blocking group is that it permits use of rather strong alkaline dehydration agents (such as potassium hydroxide, sodium hydroxide, potassium carbonate, etc.) at reflux temperatures, without the danger of the so-called homo-D-annulation about the 20-keto-17-hydroxy moiety. This side reaction is known to occur when 17-hydroxy-20-keto pregnanes are treated under the same conditions, leading to enlargement of the five-membered D-ring into a six-membered ring with concomitant loss of biological properties in the product. When the 20-keto group is blocked as by the formation of the ethylene ketal, no such undesirable reaction takes place. An additional advantage of strongly alkaline conditions for elimination of the 5-hydroxyl, is that reaction time can be brief, e.g. 15 minutes. In a similarly sensitive system (17α-OH-20-one), weak acids (acetic acid and others), or a very low concentration of mineral acid, or a low concentration of mild base have been suggested for the elimination reaction. Nonetheless, side reactions occur, leading to lower yields of the desired products. Also, to effect the presently desired rearrangement of the 6-methyl substituent from the 6β-methyl (axial conformation) to the more stable 6α (equatorial conformation), some activation energy is required, i.e. sufficiently strong conditions so as to enolize the 3-ketone and cause a 5,6-double bond to be formed by migration. The new keto form resulting from such enolate anion will all be of the more stable 6α-methyl conformation (equatorial).

The conversion is illustrated by the following formula sequence:

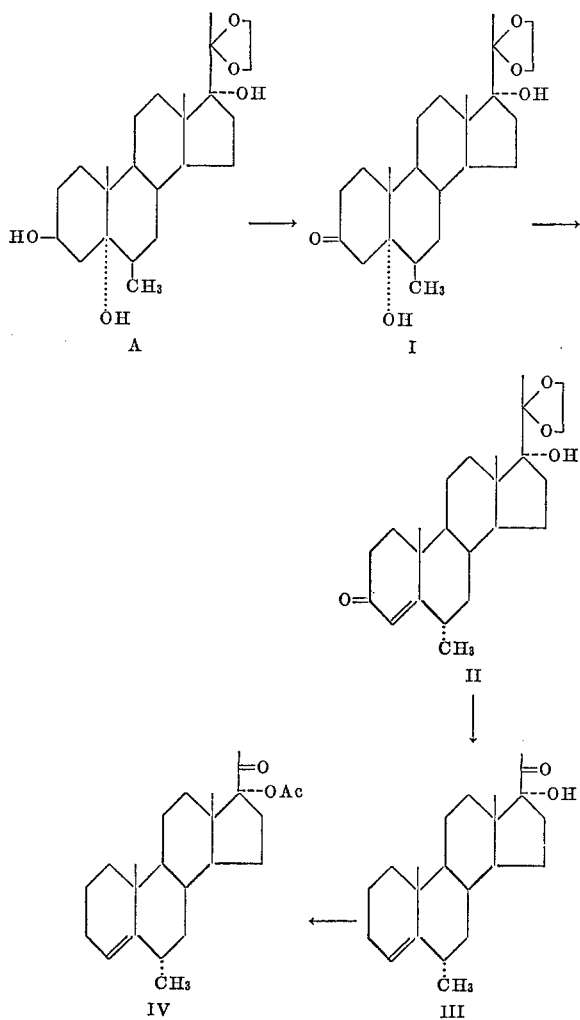

For still further understanding of the present invention, the following specific examples thereof are given.

EXAMPLE I

17α-hydroxy-20-ethylenedioxy-6α-methylpregn-4-en-3-one(II)

To a solution of 10 g. of potassium carbonate in 50 ml. of water and 600 ml. of methanol was added 20 g. of 5α,17α-dihydroxy-20-ethylenedioxy-6β-methylpregnan-3-one (I), and the mixture refluxed (with stirring) for a period of one hour. Concentration to a volume of about 200–250 ml. then led to a crystalline slurry, which was cooled, filtered and the crystals washed with 100 ml. of 1% aqueous potassium carbonate, followed by a little methanol containing a drop of pyridine. Air drying first, then at 50° C. gave a product having an extinction value at 240 mμ corresponding to log of 4.2 (indicative of completeness for the elimination reaction). Infrared measurements failed to show the presence of any 20-keto function (in the 5.9μ region). On the other hand, the ketal bands (9.5–10.5μ) were present. The yield was 17.5 g. The analytical sample was obtained by recrystallization from ether in a Soxhlet. M.P., 215–217°; $[\alpha]_D^{25°}+52°$ (Chlf.).

This product (II) is progestationally active when administered subcutaneously to laboratory test animals.

Substitution of sodium hydroxide (10 g.) for the potassium carbonate permits reduction of the reflux period to 15 minutes.

EXAMPLE II

17α-hydroxy-6α-methylpregn-4-en-20-one(III)

The 17α-hydroxy-20-ethylenedioxy-6α-methylpregn-4-en-3-one (II) (17.5 g.) in 350 ml. tetrahydrofuran was run slowly into a slurry of lithium aluminumhydride (17 g.) in 350 ml. of diethyl ether. The mixture was refluxed for 20 minutes, then cooled in an ice and water bath (stirring and an Argon atmosphere) while a solution 19 g. of anhydrous aluminum chloride in ether was added cautiously. After completion of the AlCl₃ addition, the mixture was refluxed for a period of 30 minutes. Then a slow addition of a 2 N sodium hydroxide solution caused first a heavy white precipitate to form, then after more of the aqueous sodium hydroxide solution was added, most of the precipitate dissolved, and two liquid layers formed. The aqueous layer was separated off, then extracted twice with a little ether. The main ether phase was washed twice with water—the same water used to wash the two ether extract solutions. The ether extract and the ether phase were combined and evaporated to dryness. The residue was added to acetone (200 ml.) and 2 ml. of concentrated hydrochloric acid, and the mixture was left stirring overnight at room temperature. Evaporation under reduced pressure gave a crystalline slurry from which the 17α-hydroxy-6α-methylpregn-4-en-20-one(III) was obtained by filtration. Yield: 15 g., M.P.: 180–185° C. Recrystallization from methanol gave the purified sample, M.P.: 184–186° C.

EXAMPLE III

17α-acetoxy-6α-methylpregn-4-en-20-one(IV)

The foregoing 17α-hydroxy substance (III) (15 g.) was heated with 60 ml. acetic anhydride and 300 mg. p-toluenesulfonic acid monohydrate at 70° C. until a clear solution was obtained. The mixture was then left overnight (at room temperature ambient conditions). The following morning a total of 12 ml. of water was added in portions of 2 ml., each under agitation. The temperature was allowed to rise to 80° C. and the mixture cooled down to 55° C. before adding the next 2 ml. portion of water. When the excess acetic anhydride had been reacted away, the 17-acetate was precipitated by pouring the mixture into 600 ml. of ice and water. By filtration, 17 g. of crude 17-acetate was obtained. Recrystallization from acetone provided purified 17α-acetoxy-6α-methylpregn-4-en-20-one(IV), M.P.: 175–178° C.; $[\alpha]_D^{25°}+41°$ (Chlf.).

EXAMPLE IV

A solution of 1.94 g. of 20-ethylenedioxy-6β-methylpregnan-3β,5α,17α-triol(A) in 28 ml. dimethylformamide was heated to 45° C. To this solution was added from a dropping funnel during 20 minutes, 1.85 ml. of Jones' solution. Good mechanical agitation was maintained, and the temperature was permitted to go to 50° C., but not higher. After completion of the addition, the mixture was maintained at 50° C. for two hours.

Allowing the temperature to rise to 60° C. and then maintaining the reaction mixture at 60° C. permits a reaction time somewhat less than the two hours, e.g. 100 minutes.

The product crystallized after addition of 25 ml. of water and cooling in an ice and water bath; was filtered, washed with water containing a drop of soda solution (Na₂CO₃, 2 N), collected and dried. Yield: 1.51 g. of 5α,17α-dihydroxy-20-ethylene-dioxy - 6β - methylpregnan-3-one(I), M.P.: 230–235° C.; $[\alpha]_D^{25°}-22°$ (Chlf.).

One recrystallization from ether gave the purified product, M.P.: 242°–246° C., in all aspects identical with the pyridine chromate oxidation product described in Ser. No. 521,545.

The Jones' solution referred to above was prepared by diluting 67.7 g. chromium trioxide, 57.5 ml. concentrated sulfuric acid with distilled water to a final volume of 250 ml.

What is claimed is:
1. The method of preparing 17α-hydroxy-6α-methylpregn-4-en-20-one which comprises subjecting 5α,17α-dihydroxy-20-ethylenedioxy - 6β - methylpregnan-3-one to strong alkaline dehydration conditions, forming thereby 17α-hydroxy-20-ethylenedioxy-6α-methylpregn - 4 - en-3-one, thereafter reducing with lithium aluminum hydride and hydrolyzing to form 17α-hydroxy-6α-methylpregn-4-en-20-one.

2. The method of claim 1 wherein the 17α-hydroxy-6α-methylpregn-4-en-20-one is subsequently acetylized to form 17α-acetoxy-6α-methylpregn-4-en-20-one.

3. The method of claim 1 wherein the reduction is effected by lithium-aluminum hydride in the presence of catalytic amounts of anhydrous aluminum chloride.

4. The method of claim 1 wherein the 5α,17α-dihydroxy-20-ethylenedioxy-6β-methylpregnan-3-one is prepared by reacting a solution of 20-ethylenedioxy-6β-methylpregnan-3β,5α,17α-triol in dimethyl formamide with chromium trioxide and sulfuric acid.

5. The method of converting 20-ethylenedioxy-6β-methylpregnan-3β,5α,17α-triol to 5α,17α-dihydroxy-20-ethylenedioxy-6β-methylpregnan-3-one which comprises reacting a dimethyl formamide solution of the triol with chromium trioxide and sulfuric acid at temperatures in the range of about 30°–60° C.

6. The method of claim 5 wherein reaction temperatures are in the range of about 50°–60° C.

7. The process of converting secondary hydroxy 20-ketal steroids into 20-ketal keto steroids while leaving the ketal group intact, which comprises reacting a dimethylformamide solution of the secondary hydroxy 20-ketal steroids with chromium trioxide and sulfuric acid at a temperature in the range of 30°–60° C.

8. 17α-hydroxy - 20 - ethylenedioxy-6α-methylpregn-4-en-3-one.

References Cited

UNITED STATES PATENTS 3,377,364   4/1968   Spero _____ 260—397.4

OTHER REFERENCES

Brown et al.: "J.A.C.S.", vol. 86 (1964), p. 2183 relied on.

ELBERT L. ROBERTS, Primary Examiner

U.S. Cl. X.R.

260—397.4